United States Patent [19]
de Ruyter et al.

[11] Patent Number: 5,596,590
[45] Date of Patent: Jan. 21, 1997

[54] BEAM DIVERTING SHUTTER FOR A LASER BEAM

[75] Inventors: Anthony J. de Ruyter, San Diego; David W. Means, Carlsbad, both of Calif.

[73] Assignee: Cymer Laser Technologies, San Diego, Calif.

[21] Appl. No.: 591,754

[22] Filed: Jan. 25, 1996

[51] Int. Cl.$^6$ .................................................. H01S 3/121
[52] U.S. Cl. .............................. 372/14; 372/9; 372/107; 372/108; 372/109
[58] Field of Search .................................... 372/9, 10, 14, 372/15, 99, 107, 108, 109; 385/16, 18, 25, 27

[56] References Cited

U.S. PATENT DOCUMENTS

| | | | |
|---|---|---|---|
| 3,575,669 | 4/1971 | Haeff | 372/107 X |
| 4,547,651 | 10/1985 | Maruyama | 372/15 X |
| 4,648,692 | 3/1987 | Kinoshita | 372/107 X |
| 4,684,209 | 8/1987 | Mori | 385/25 X |
| 4,699,450 | 10/1987 | Mori | 385/25 X |
| 4,769,824 | 9/1988 | Seki | 372/107 |
| 4,798,452 | 1/1989 | Erb | 372/107 X |
| 4,947,399 | 8/1990 | Sheldon et al. | 372/29 |
| 4,972,428 | 11/1990 | Hinz et al. | 372/99 |
| 5,084,898 | 1/1992 | Dorschner et al. | 372/107 |

*Primary Examiner*—Brian Healy
*Attorney, Agent, or Firm*—David J. Power

[57] ABSTRACT

A shutter mechanism having a slide element coupled to a support base by a plurality of roller bearings journaled between opposing pairs of guide rods is disclosed. The slide element and support base have corresponding beam apertures in alignment when the shutter is in its open position. Angularly mounted on the slide, adjacent to the slide's beam aperture, is a UV reflective mirror. When the shutter is commended to close, an actuator forces the slide and support base apertures out of alignment, while simultaneously positioning the UV reflective mirror into the position previously occupied by the slide's aperture. A laser beam, previously being transmitted through the aligned apertures, will be reflected by the mirror to a beam stop as a diagnostic instrument mounted on the support base.

13 Claims, 4 Drawing Sheets

BEAM DIVERTING SHUTTER FOR A LASER BEAM

FIELD OF THE INVENTION

The present invention relates to shutter mechanisms for laser systems, particularly to an improved design for mechanical shutters.

BACKGROUND OF THE INVENTION

The fundamental requirement of a shutter system is to provide a complete mechanical blockage of an energy source, such as light. What distinguishes shutter systems from other electromagnetic modulation devices is the use of a straight-through clearance aperture having no optical surfaces to modify the electromagnetic wave front. Typically, shutter systems are designed to function as either safety interlocks, as modulators, or in both capacities depending on the intended application.

When used as a safety interlock in an application such as a laser system, the shutter is used to block and absorb the laser beam whenever the laser's control system receives a request to establish a safe condition. A typical control system is comprised of a DC power supply, a relay or solid state device that switches the actuator which drives the shutter mechanism, and associated microprocessor based logic components. An example of such a control system is described in U.S. Pat. No. 4,513,345, incorporated herein by reference.

Generally, shutter systems are mounted directly to the output port of the laser head, or in some cases a separate housing is constructed to enclose the laser output and shutter mechanism, thereby serving to prevent access to the laser beam. The properties of a shutter system, particularly those used in conjunction with a laser system, require that they absorb all of the incident beam energy, with very little back scattering. Most prior art designs have sought to contain the resulting back scatter by utilizing a simple enclosure to allow absorption of the back scatter energy into the laser head and associated laser components contained in the enclosure. Two of the problems associated with this type of design are feedback of scattered energy into the optical system and the increased risk of leakage from the enclosure, thereby creating a safety hazard. As optical power levels escalate, these considerations become increasingly important from a design perspective.

An example of a well-known magnetic flexure type shutter is depicted in FIG. 1, which includes a very thin flexible foil 2 which is deflected into a beam path 4 by an electromagnet 6. The foil 2 is seen as being attached at one end to a collar 8 by a retaining screw 10, and lies parallel to and below the beam path 4 when the electromagnet is inactive. The electromagnet is of conventional design, having a ferrite core 12 surrounded by a magnetic winding 14 on a pancake bobbin. In operation, the winding 14 is energized, thereby activating the magnet 6 and causing the free end 2' of foil 2 to be attracted to magnet 6, moving across beam path 4. As foil 2 intercepts the beam path, the beam is reflected away at an increasing angle of reflection as foil end 2' moves into a biased position adjacent the magnet 6. In the full, closed position, as shown in FIG. 1, the foil conforms flat as it biases against the magnet, bending into an "S" shape as it approaches the retaining screw 10, providing an incident angle of about 50° to 60° for beam interception.

The foil 2 is extremely thin to allow for the required flexibility to enable the foil to contort into the "S" configuration. This required thinness, however, is inherently weak, particularly at stress points in the "S" shaped bends, and is also not thermally suitable for conducting away heat resulting from absorption of higher power lasers. Another aspect of the foil arrangement is that the foil reflects the light beam at an angle near that of the unaltered beam path, resulting in unwanted stray reflection lines appearing at the target plane as the foil end 2' begins to intercept the beam, continuing until the foil end is flat-biased against the magnet. Since the reflection is at a very narrow angle with respect to the unaltered beam path 4, the reflection cannot be eliminated in the device, and the fully closed "S" shape allows for a back scattering of laser light, whose effects as previously discussed are undesirable, from a safety standpoint and also from a component standpoint. This is due primarily as a result of the absorbed back scattered energy, and the contaminating of the exposed optics, including the shutter's own reflective mirror, as a result of this out gassing.

SUMMARY OF THE INVENTION

An object of the present invention is to provide an improved automatic shutter for use in a laser system, such as an excimer laser, capable of blocking and diverting the output of a laser beam;

It is a further object of the present invention to provide a shutter mechanism having an internal configuration in which any reflected energy is multiply scattered, thereby preventing leakage of any back scattered energy.

It is a feature of the present invention to use a reflective surface to divert the laser beam, when the shutter is in a closed position, to a secondary device, such as a diagnostic device.

It is another feature of the present invention to have the beam stop function as a diagnostic mount, for the attachment of diagnostic instrumentation, to allow the coupling of such instrumentation without disturbing the output delivery system of the laser.

The objects and features of the present invention are realized by use of a shutter system having a slide mechanism mounted on a rod-roller bearing support which restricts the slide to a single degree of freedom. The rod-roller beam supports provide a rolling contact interface between the slide and the shutter's support base. The roller bearings are constructed of a hardened precision ground steel and are subjected to only a light force load due to the unique rod-roller configuration, thereby allowing the slide to function without lubrication. The shutter's support base incorporates a beam aperture positioned in alignment with the output beam of the laser system. The slide has a corresponding aperture of identical dimensions which aligns with the support aperture when the slide is fully retracted in the open position, thereby allowing the output beam of the laser to egress through the shutter uninterrupted. Mounted on the slide, adjacent to the slide aperture, is a dielectric mirror positioned at an angled position relation to the beam path. When the shutter mechanism of the present invention is commanded to move from the open to the closed position, an actuator coupled to the slide causes the slide to ride the roller bearings along its single degree of freedom, positioning the mirror in the beam path. The beam is reflected off the mirror's angulated surface and diverted to a shutter housing aperture. Because the mirror is fixedly mounted to the slide, when the slide is in the closed position to deflect the output beam, the slide aperture is likewise orthogonally repositioned out of alignment with the housing aperture. The close tolerances between the slide and the support base, combined with the slide aperture repositioning, create a multiple number of reflective surfaces through which any back scatter energy would be required to negotiate in order to leak from the housing enclosing the slide and mirror components. As a result, the problem of back scatter leakage is effectively eliminated. The shutter housing aperture is adapted to allow secondary devices to be attached to the shutter support base and positioned directly in line with the reflected beam path. An interlock safety switch is mounted on the shutter support base adjacent to the shutter housing aperture, to ensure that a secondary device, either diagnostic or beam stop, is present before the laser system will operate.

DETAILED DESCRIPTION OF THE DRAWINGS

Figure 1:
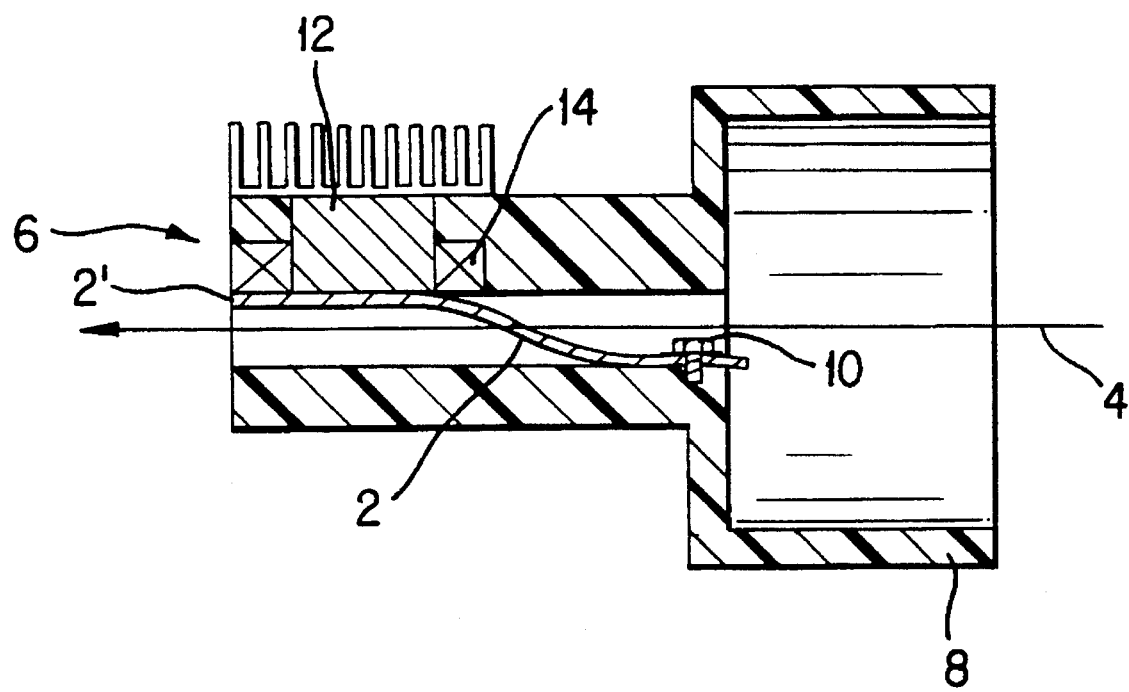
FIG. 1 depicts an electromagnetic shutter mechanism of prior art design.
Figure 2:
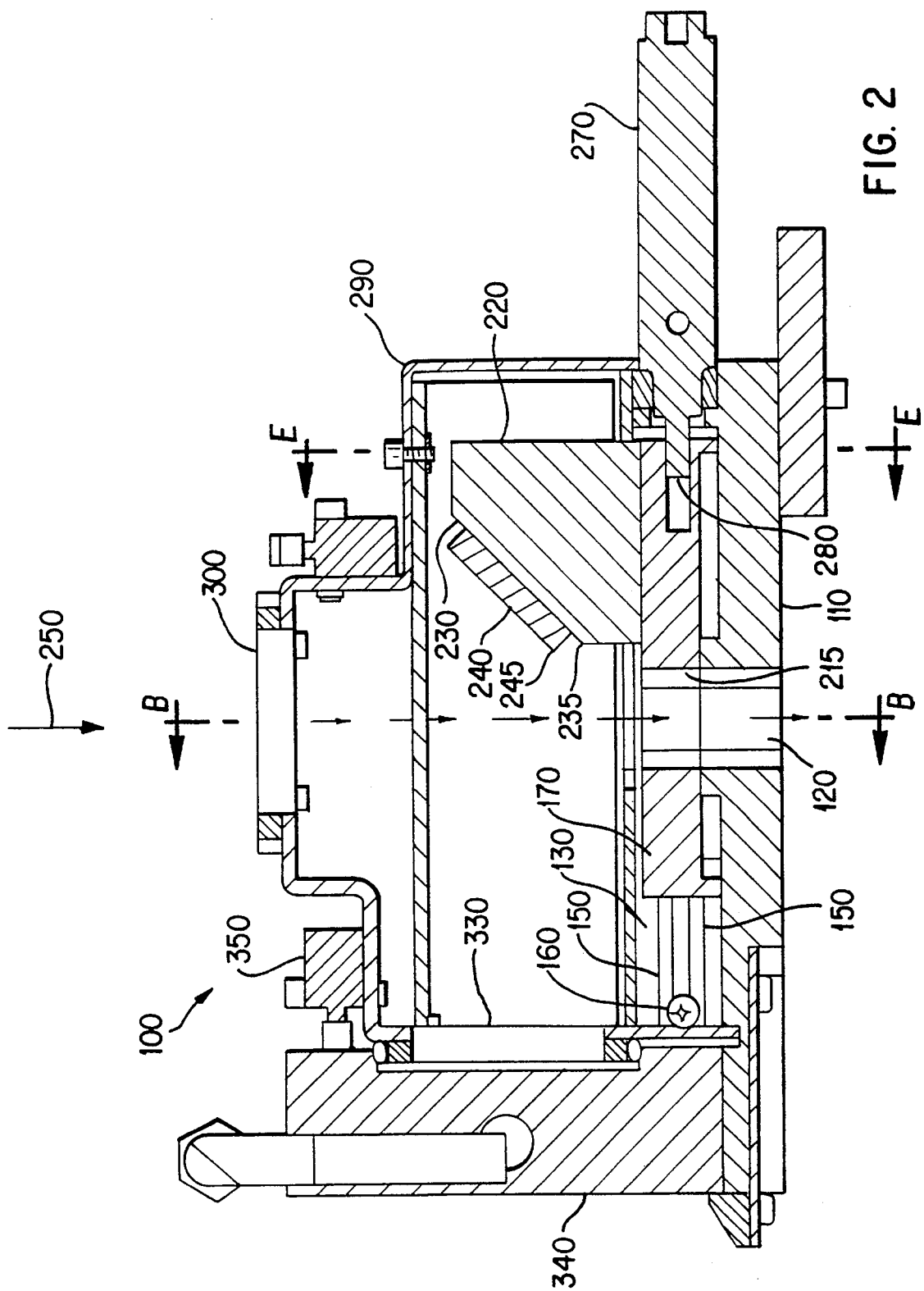
FIG. 2 depicts a side view of the shutter mechanism of the present invention in the open position.
Figure 3B:
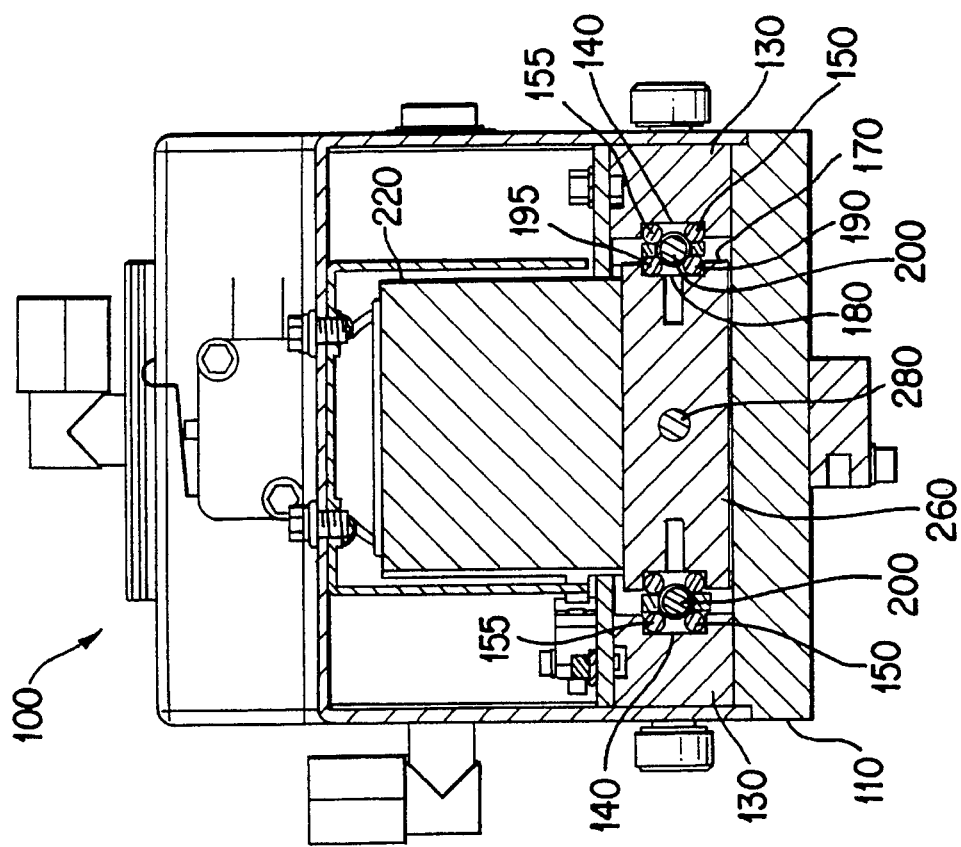
FIG. 3b depicts an end view of the present invention along section line E—E.
Figure 3A:
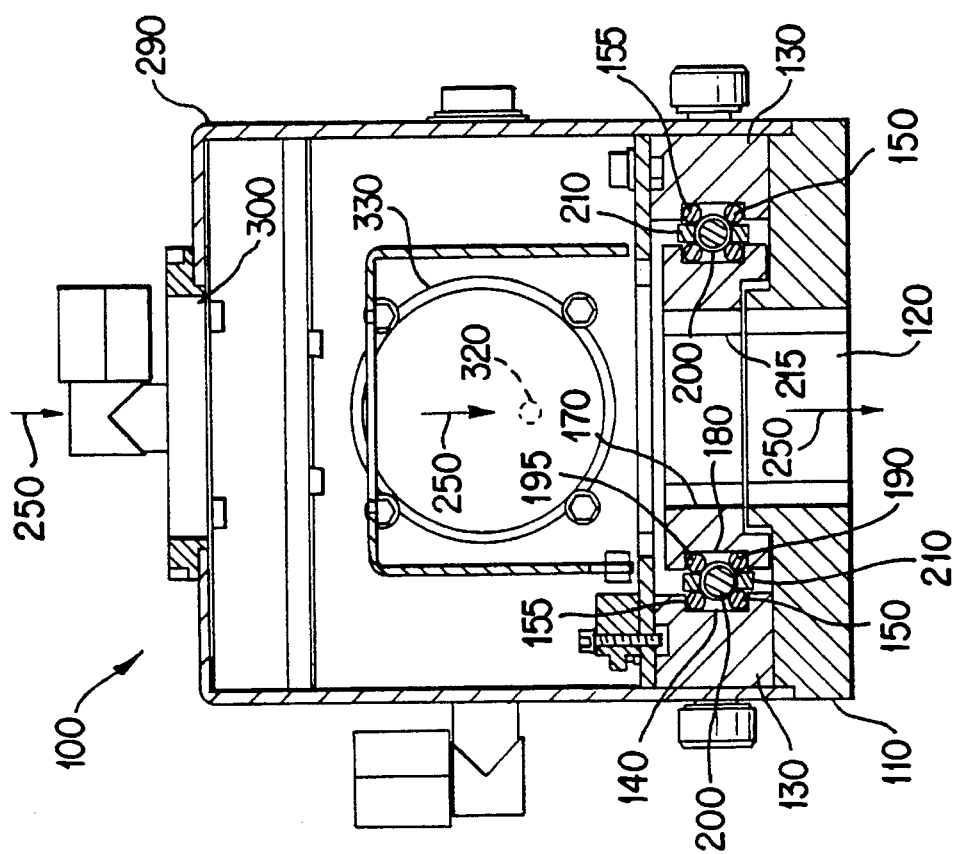
FIG. 3a depicts an end view of the present invention along section lines B—B.

Referring now to FIG. 2, a preferred embodiment of the shutter device of the present invention is disclosed, indicated in the figure as 100. Shutter 100 comprises a rigid shutter support base 110, having a base beam aperture 120 centrally positioned therein, as also shown in FIG. 3a. It is preferred that support base be constructed of a material which is insensitive to ultraviolet energy, such as uncoated aluminum. Referring to FIG. 3a and 3b, depicting shutter 100 along its horizontal-longitudinal axis, rod guide supports 130 are shown more clearly as being mounted on the peripheral edge of support base 110 on either side of beam aperture 120. On the aperture side, rod guide supports 130 each have a mounting slot 140 containing guide rods 150 and 155 positioned at the lower and upper ends respectively of slot 140. The rods 150 and 155 preferably have a diameter equal to the depth of slot 140 to create a flush internal surface on the aperture face of rod guide supports 130. Rods 150 can be secured into position by any of several well-known means; as shown in FIG. 2, a simple screw 160 is used to biasly secure the rods into position. Preferably rods 150 and 155 are constructed from a case-hardened material which is compatible with, and will not deform while subjected to fit tolerance operation with the roller bearings discussed infra. For excimer laser applications, it is preferred to use stainless steel due to the operational cleanliness requirements of the material.

Referring again to FIG. 3a and 3b, slide shutter element 170 is shown along its longitudinal axis, having a slide mounting slot 180 containing slide rods 190 and 195 in an upper and lower position respectively, which mirrors and is symmetric to the arrangement in rod guide support 130, including a securing means (not shown) operationally equivalent to screw 160. Like support base 110, slide shutter 170 is manufactured from a UV insensitive material, preferably uncoated aluminum, and rods 190 and 195 are likewise manufactured from stainless steel type of material.

A plurality of hardened roller bearings 200 are journaled between rods 150, 155, 190 and 195 to allow slide shutter element 170 to move in rolling contact along rods 150, 155, 190, and 195 in a single degree of freedom along its longitudinal axis. The number of bearings used will be a design choice based upon dimensional and operational requirements, as those skilled in the art will appreciate. For the design shown in FIGS. 3a and 3b, six roller bearings were positioned on each side of slide shutter 170 as described herein. Roller bearings 200 are of conventional design and precision ground from a hardened material such as stainless steel. The roller bearings 200 are segregated from each other by utilizing synthetic buffer strip 210 which is UV tolerant, from a material such as PTFE, such as Teflon®, and having a series of individual internal holes (not shown) to accommodate each of said roller bearings. Fit tolerances between roller bearings 200 and the symmetric guide rod pairs are minimized so that movement of slide-shutter 170 is constrained to its longitudinal axis with no lateral play. The use of multiple roller bearings in a side mounted, fit tolerance relationship as described allows the weight of slide shutter 170 to be distributed among each of the roller bearings 200, resulting in each of said roller bearings being lightly loaded. This light loading allows the slide element to function without the need for lubrication and operate within the required signal-to-close/open activation time of about 200 ms to about 300 ms. Slide beam aperture 215 is centrally positioned and in alignment with base beam aperture 120 when the shutter mechanism is in the open position. Preferably, the alignment between base beam aperture 120 and slide beam aperture 215 is within 0.005 inches, and the fit tolerance between slide shutter 170 and support base 110 within 0.020 inches.

Figure 4:
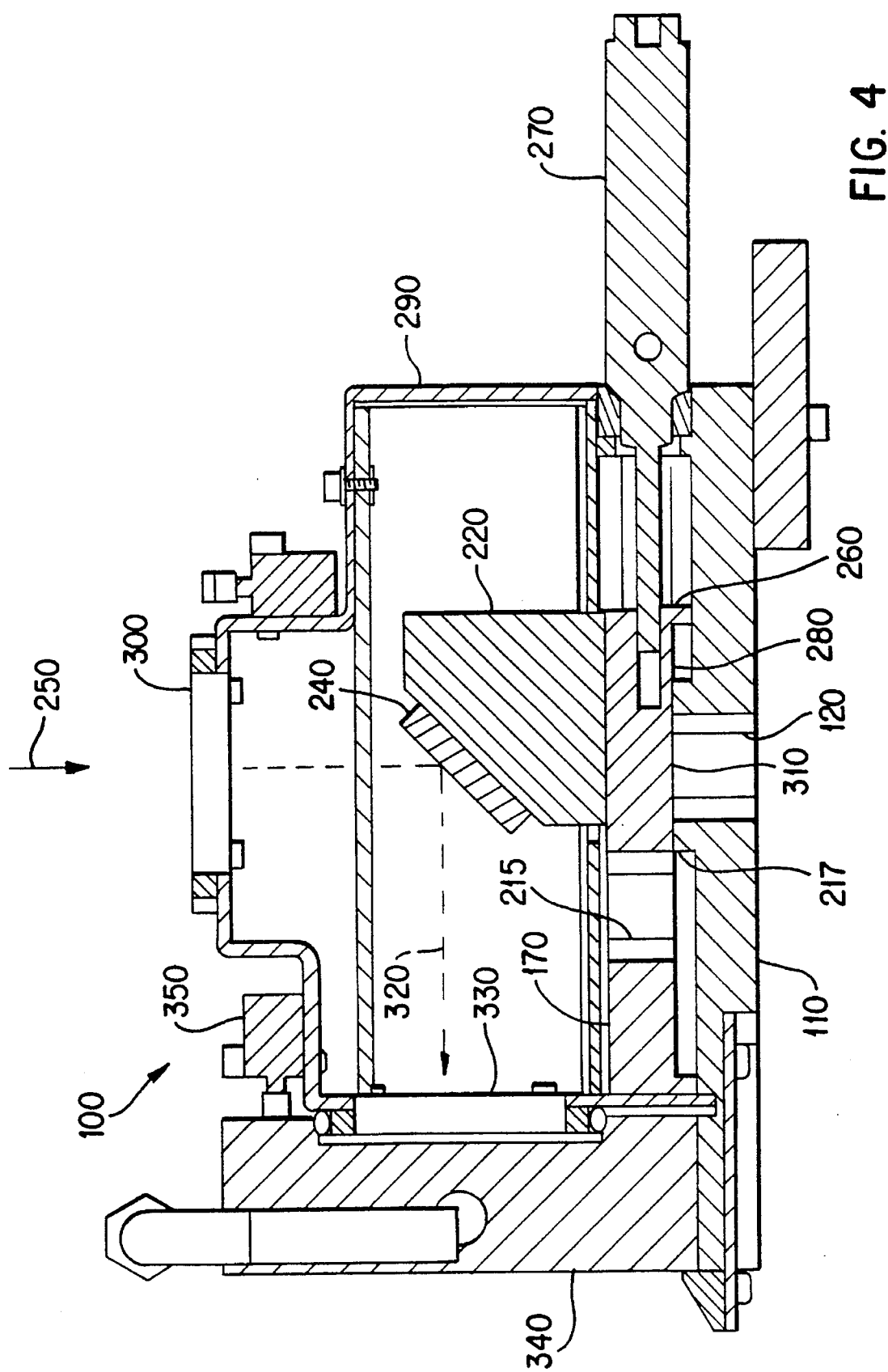
FIG. 4 depicts a side view of the present invention, having the shutter housing omitted for clarity, in the closed position.

Referring now to FIG. 2, mounted on top of slide shutter 170 is mirror base 220 (also shown in FIG. 3b), having an angulated support face 230 oriented to face the output path of the laser beam 250. The specific angle of support face 230 will be operationally dependent, as those skilled in the art will readily recognize, based upon the orientation of the output beam of the laser system and the desired beam deflection angle. In the embodiment depicted in FIG. 2 the support face is angled to provide a 45 degree angle of incidence between dielectric mirror 240, mounted on support face 230, and output beam 250. Mirror 240 is positioned on support face 230 such that the bottom edge of the front face 245 is approximately aligned or slightly overhanging with respect to the bottom edge 235 of support face 230 to facilitate output beam engagement discussed infra. Material choices for mirror 240 will likewise be operationally dependent, based in principle upon the type of laser system being used. For example, for an excimer laser system mirror 240 would be required to have the front face be a UV light-reflecting surface, preferably made from a fused silica material. An additional feature incorporated in the mirror design is to have the back face be a visible light-reflecting surface to facilitate alignment of the laser's optical components as will be described infra. Attached to rear longitudinal face 260 (as shown in FIG. 4) of shutter slide 170 is actuator means 270. In the described embodiment, actuator means 270 is a pneumatic actuator such as those manufactured by BIMBA, and is operably coupled to longitudinal face 260 by actuating rod 280. While the depicted embodiment describes a pneumatic actuator, other actuator means meeting the signal-to-close/open time limitations operationally required may be substituted, such as electromagnetic or the like. For use in an excimer laser system, the pneumatic system manufactured by BIMBA was chosen due to its signal-to-close/open actuation time of about 300 ms.

Referring again to FIGS. 2 and 3a, a housing 290, manufactured from a material such as uncoated aluminum, encloses the shutter slide and mirror base combination and includes an incoming beam port 300 designed to transmit only the incoming light of beam 250. With the shutter mechanism in the open position, as shown, slide shutter 170 is retracted, thereby positioning mirror base 220 and attached mirror 240 away from beam 250, while simultaneously aligning slide aperture 215 with base aperture 120 to allow beam 250 unimpeded egress for operational use. Referring now to FIG. 4, when the shutter is commanded to move to the closed position, through a laser control means not shown but well known by those skilled in the art, actuator 270 forces slide shutter 170 to move forward along the roller bearing/guide rod arrangement previously described. As slide shutter 170 moves forward, mirror 240 is positioned to reflectively engage beam 250, while slide aperture 215 is repositioned out of alignment with base aperture 120, with the slide's bottom face 310 closing off and effectively light-sealing base aperture 120. This light sealing aspect of the present invention is achieved as a result of the close tolerances, of about 0.020 inches, between slide shutter 170 and support base 110; as well as the repositioning of slide aperture 215 out of alignment with base aperture 120. In order to leak from housing 290, back scattered energy would have to be reflected through slide aperture 215, re-reflected through shutter/support tolerance gap 217, and again reflected through support aperture 120, as shown in FIG. 4. As a result, the problems associated with leakage of back scattered energy is, for the most part, eliminated.

It is to be noted that as a result of the alignment of the bottom edges 235 and 245 of the support face 230 and mirror 240, respectively, the mirror intercepts beam 250 ahead of edge component 235 encroaching the path of beam 250, to immediately divert beam 250 without any inadvertent reflections. It is preferred that the operation time from open to close occur in about 0.200 ms. As shown in the preferred embodiment in FIGS. 3b and 4, beam 250 is reflectively diverted through 90°, wherein diverted beam 320 is directed to diverter port 330. Coupled to diverter port 330 and rigidly mounted on the peripheral edge of shutter support base 110 is diagnostic instrument means 340. Preferably, the means for coupling diagnostic instrument is of universal design to accommodate a variety of instruments for optical analysis or diagnosis. When diagnostic instrument means 340 is removed, and interlocks activated by the open switch a device such as a collimating telescope can be attached to diverter port 330 and used to facilitate alignment of the laser optics by utilizing the visible light reflection off the back face of mirror 240, as previously described. To ensure the laser system being used cannot operate unless an instrument means is present to block diverted beam 320, a safety interlock switch 350 is mounted at the aperture. This arrangement allows the alignment of the optics by remote access, thereby eliminating the need for disassembly of the laser delivery systems.

While the invention has been described in connection with what is presently considered to be the preferred embodiments, it is to be understood that the invention is not limited to the disclosed embodiments, but on the contrary, covers various modifications and equivalents included within the spirit and scope of the following claims. Therefore, persons of ordinary skill in this field are to understand that all such equivalents are included within the scope of the claims.

What is claimed is:

1. A shutter apparatus for use in a laser system comprising:

a shutter support base having a diagnostic instrument mount and a first beam aperture disposed therein;

a shutter slide operably coupled to the shutter support base by a rod-roller bearing support to allow the shutter slide to articulate in a direction parallel to a horizontal axis of the shutter support base, said shutter slide having a second beam aperture disposed therein;

a light reflection means angularly mounted on said shutter slide along an edge of said second beam aperture;

an actuating means coupled to said shutter slide;

a housing mounted to said shutter support base to light seal the shutter slide and light reflection means located therein, said housing having a beam port disposed therein, said beam port being constructed to restrict light transmission to an incoming beam, wherein when said shutter apparatus is in an open mode said first and second apertures are aligned to allow said beam to pass therethrough unimpeded, and when said shutter apparatus is activated to a closed mode, said actuator means slides said shutter slide along said rod-roller bearing supports to reposition said first aperture out of alignment with said second aperture and simultaneously move said light reflection means into engagement with said transmitted beam to deflect said beam to a diagnostic instrument coupled to said diagnostic instrument mount.

2. The shutter apparatus of claim 1 wherein said rod-roller bearing support further comprises a plurality of roller bearings journaled between pairs of guide rods.

3. The shutter apparatus of claim 2 wherein said light reflection means is a mirror.

4. The shutter apparatus of claim 2 wherein the plurality of roller bearings distributes the weight of said shutter slide among all said bearings to create a light support load for each said bearing.

5. The shutter apparatus of claim 4 wherein said light loading eliminates the need for lubrication in said bearings.

6. The apparatus of claim 5 wherein said roller bearings and said guide rods are manufactured from a case-hardened stainless steel.

7. The apparatus of claim 3 wherein said mirror further comprises a UV reflecting surface on a front face and a visible light reflecting surface on a back face.

8. The apparatus of claim 1 wherein said actuating means is pneumatic and capable of an activation time at or between about 200 ms to about 300 ms.

9. The apparatus of claim 1 wherein said actuating means is electromagnetic and capable of an activation time at or between about 200 ms to about 300 ms.

10. A shutter apparatus for an excimer laser system comprising:

a shutter support base having a slide slot disposed therein with an instrument mount positioned at one end of said support base and a first centrally positioned beam aperture;

a shutter slide operably coupled to interface with said slide slot by a plurality of roller bearings journaled between pairs of guide rods secured to interface edges of said shutter slide and said support base in said slide slot, said shutter slide having a centrally positioned second beam aperture disposed therein;

a UV reflective mirror angularly mounted on said shutter slide at a base of said second beam aperture;

an actuating means coupled to said shutter slide, wherein upon command said actuating means will move said shutter slide from an open position, in which said first and second beam apertures are aligned and a laser beam can be transmitted therethrough, to a closed position by slidably repositioning said second aperture out of alignment with said first aperture while simultaneously positioning said UV reflective mirror into engagement with said laser beam to deflect said beam to an instrument coupled to said instrument mount;

a housing having a beam port disposed therein and mounted to said shutter support base to light seal said shutter slide and said mirror located therein, wherein in said closed position back scattered energy from said deflected laser beam will multiply reflect in said housing, said first and second apertures being light sealed as a result of said repositioning and a close tolerance fit between said shutter slide and said support base.

11. The apparatus of claim 10 wherein said roller bearings and guide rods require no lubrication as a result of said roller bearings equally distributing the weight of said shutter slide in a light support load configuration.

12. The apparatus of claim 10 wherein the UV mirror has a front face for reflecting UV light and a back face for reflecting visible light, said back face being in operable alignment with an optics module coupled to said laser system to allow alignment of said optics module by remote access.

13. The apparatus of claim 10 wherein the actuator means is pneumatic and capable of articulating said shutter slide from open-to-closed and closed-to-open positions in a time span of about 200 ms to about 300 ms.

* * * * *